2,893,981
Patented July 7, 1959

2,893,981

RECOVERING OLEFIN POLYMERS

John L. Ernst, Augustus B. Small, and Lawrence W. McLean, Baton Rouge, La., assignors to Esso Research and Engineering Company, a corporation of Delaware No Drawing. Application June 29, 1954
Serial No. 440,252

4 Claims. (Cl. 260—94.8)

This invention relates to an improved method of recovering high molecular weight, especially very high mol. wt. polyisobutylene.

It is known that isobutylene can be polymerized by Friedel-Crafts catalysts at temperatures below 0° C. to make polymers of relatively low, medium or high mol. wt. Both the low mol. wt. (e.g. about 10,000–20,000, Staudinger), and the medium mol. wt. (about 70,000–120,000) polymers have been made commercially and are currently available on the market. They are generally polymerized at about —20 to —50° C. in the presence of a hydrocarbon liquid, such as propane or hexane, etc., which is a solvent for the polymer as well as the monomer. The solution can be washed with water, or aqueous caustic soda, etc., to inactivate and remove catalyst, and then the solvent can be flashed off from the polymer, without difficulty.

However, to make very high mol. wt. polyisobutylene, e.g. having a Staudinger mol. wt. above 180,000, and preferably 200,000–500,000, a different technique has been found advisable, namely polymerizing in 1–10 volumes of methyl chloride or other lower halo-alkane, and of course at a much lower temperature, i.e. about —100 to —160° F., using a strong catalyst such as $AlCl_3$ dissolved in methyl chloride, and preferably using high purity isobutylene, i.e. at least 99% pure, and preferably containing not more than 0.5% n-butenes. This polymerization can conveniently be carried out in a commercial plant normally intended for making butyl rubber, i.e. GR-1 (isobutylene-isoprene) synthetic rubber.

Butyl rubber is normally recovered by discharging the cold polymerization reaction slurry (of fine insoluble butyl rubber in methyl chloride) into a hot water flash tank containing zinc stearate or sodium stearate as slurrying agent, but purposely controlled to a pH below 7, and preferably 4.5 to 6.5, for satisfactory polymer quality. This same recovery procedure may be used for a medium mol. wt. polyisobutylene, even up to 160,000 mol. wt. or so, if the flash tank water is maintained at a pH of about 7. However, polymer having a mol. wt. above 180,000 tends to form long strings which mat together, and cannot be slurried at pH of 7, even if more zinc stearate slurry aid is used.

It has now been discovered that polymer of mol. wt. above 180,000 can be satisfactorily slurried if caustic soda or other alkaline substance is added to the slurry water to maintain a pH above 8.0, preferably above 8.5. Best results have been obtained with a pH of 9–12.

In carrying out the invention, it is desirable to have effective rapid mixing of the cold slurry with a hot spray of the high pH aqueous slurry, to insure rapid flashing of all methyl chloride and also all residual unreacted materials. A flash tank water temperature of at least 140° F. should be used, and preferably in the range of about 150–170° F. It is best to let the cold polymerization effluent fall onto a spray just beyond the point of convergence of several streams making up the spray. Other methods may be used such as shown in Patents 2,504,488 and 2,561,256.

The invention will be better understood from a consideration of the following experimental data.

A continuous polymerization process was carried for polymerizing isobutylene at —95° C. in 10 wt. percent concentration in methyl chloride, using a feed rate of 600 cc./min. of that feed solution, and a catalyst feed rate of 12 cc./min. of a solution of 0.05 g. $AlCl_3$ per 100 cc. of methyl chloride solvent.

The polymerization was carried out to 70 wt. percent conversion, giving a polymerization effluent slurry composition containing about 7.0 wt. percent of polymer, which was polyisobutylene having a Staudinger mol. wt. of about 200,000. Polymer was continuously recovered from this cold effluent by letting it run down a chilled trough and fall directly onto a hot aqueous spray of water containing 2% of sodium stearate, based on polymer, and sufficient NaOH to get the desired pH, which was purposely varied, as shown in the following table. The spray was made up of streams converging at a point; and the cold effluent fell onto the spray just beyond the point of convergence. This spray was located about one inch above water level in a flash drum.

In these tests, the pH of the hot slurry water was varied from 7.5 to 12, and the temperature was maintained at about 150–170° F. The quality and particle size of the resulting polyisobutylene-water slurries were observed, as recorded in the following table.

Table

| Test Period | A | B | C | D |
|---|---|---|---|---|
| pH | 7.5 | 8.0 | 9.0 | 12.0. |
| Slurry: Quality | Poor | Fair but unsatisfactory. | Good | Excellent. Very fine particles. |
| Particle Size | Stringy and Matted. | Lumps, 1 inch and larger. | 4 mesh | 20 mesh. |

These data show that a flash tank water pH even up to 8.0 did not give satisfactory slurries of this 200,000 mol. wt. polyisobutylene in water, but that a pH of 9.0 to 12.0 gave satisfactory slurries.

It is not intended that this invention be limited unnecessarily to the specific examples and modifications which have been given merely for illustration, but only by the appended claims in which it is intended to claim all modifications coming within the scope and spirit of the invention.

We claim:

1. In a process of manufacturing polyisobutylene having a Staudinger molecular weight of above 180,000 up to about 500,000 by Friedel-Crafts polymerization at about —100° to —160° F., in an inert diluent, the improvement which comprises discharging the cold dispersion of polyisobutylene formed in said diluent into a hot aqueous liquid; maintaining the resulting mixture at a temperature level of at least about 140° F. and a pH of above 8.5 and agitating the mixture formed sufficiently to produce a slurry of discrete polyisobutylene particles essentially of the 4 to 20 mesh size range.

2. In a process of manufacturing polyisobutylene having a Staudinger molecular weight of about 200,000 to 500,000 by Freidel-Crafts polymerization at about —100° to —160° F. in a methyl chloride diluent, the improvement which comprises discharging the cold dispersion of polyisobutylene formed in said diluent into a hot aqueous liquid; maintaining the resulting mixture at a temperature of at least 150° F. and a pH of between about 9 and 12 and agitating the mixture formed sufficiently to produce a slurry of discrete polyisobutylene particles essentially of the 4 to 20 mesh size range.

3. A process according to claim 1 using about 1 to 20 parts by weight of diluent per part by weight of isobutylene.

4. A process according to claim 2 in which the cold dispersion of polyisobutylene is discharged into a hot aqueous liquid and the temperature of the resulting mixture maintained between about 150° and 170° F.

References Cited in the file of this patent

UNITED STATES PATENTS

| | | |
|---|---|---|
| 2,451,047 | Skooglund | Oct. 12, 1948 |
| 2,694,054 | Thomas | Nov. 9, 1954 |